US008126819B1

(12) United States Patent  
Ersek

(10) Patent No.: US 8,126,819 B1
(45) Date of Patent: Feb. 28, 2012

(54) ONLINE LAWN CARE ESTIMATE PROCESS

(75) Inventor: Barrett A. Ersek, West Chester, PA (US)

(73) Assignee: Happy Lawn of America, Inc., West Chester, PA (US)

( * ) Notice: Subject to any disclaimer, the term of this patent is extended or adjusted under 35 U.S.C. 154(b) by 0 days.

(21) Appl. No.: 12/048,605

(22) Filed: Mar. 14, 2008

(51) Int. Cl.
*G06Q 50/00* (2012.01)
(52) U.S. Cl. ......... 705/313; 705/306; 705/314; 709/203
(58) Field of Classification Search ................. 705/313, 705/314, 306
See application file for complete search history.

(56) References Cited

U.S. PATENT DOCUMENTS

| | | | |
|---|---|---|---|
| 5,214,757 A | 5/1993 | Mauney et al. | |
| 5,315,504 A | 5/1994 | Lemble | |
| 6,076,080 A | 6/2000 | Morscheck et al. | |
| 6,216,108 B1 | 4/2001 | LeVander | |
| 6,327,570 B1 | 12/2001 | Stevens | |
| 6,609,118 B1 | 8/2003 | Khedkar et al. | |
| 6,629,083 B1 | 9/2003 | Morton | |
| 6,687,614 B2 | 2/2004 | Ihara et al. | |
| 6,748,369 B2 | 6/2004 | Khedkar et al. | |
| 6,959,319 B1 * | 10/2005 | Huang et al. ................... | 709/203 |
| 7,003,487 B1 * | 2/2006 | Skirpa ............................. | 705/37 |
| 7,028,261 B2 * | 4/2006 | Smyth et al. .................. | 715/744 |
| 7,039,807 B2 | 5/2006 | Spitz | |
| 7,076,348 B2 | 7/2006 | Bucher et al. | |
| 7,086,085 B1 | 8/2006 | Brown et al. | |
| 7,099,882 B2 | 8/2006 | McDonough | |
| 7,240,022 B1 * | 7/2007 | Bistriceanu et al. ........ | 705/14.19 |
| 7,249,146 B2 | 7/2007 | Brecher | |
| 2001/0042002 A1 | 11/2001 | Koopersmith | |
| 2002/0007378 A1 * | 1/2002 | Tanaka et al. ................. | 707/513 |
| 2002/0052755 A1 * | 5/2002 | Whatley et al. .................. | 705/1 |
| 2002/0198736 A1 | 12/2002 | Harrison | |
| 2003/0033269 A1 | 2/2003 | Ebertshauser | |
| 2003/0036963 A1 * | 2/2003 | Jacobson et al. ................ | 705/26 |
| 2003/0069818 A1 | 4/2003 | Menninger | |
| 2003/0139967 A1 | 7/2003 | Carleton | |
| 2003/0236723 A1 | 12/2003 | Angott | |
| 2004/0034571 A1 | 2/2004 | Wood et al. | |

(Continued)

FOREIGN PATENT DOCUMENTS

EP        1158424 A1        11/2001

(Continued)

OTHER PUBLICATIONS

Dvid. Hughes and Roger Hinson: "Estimating the Value of the Green Industry to Louisiana's Economy", 2000 p. 1-14.*

*Primary Examiner* — John Weiss
*Assistant Examiner* — Kira Nguyen
(74) *Attorney, Agent, or Firm* — Blank Rome LLP

(57) ABSTRACT

An online lawn care service quoting method and system are disclosed. The method and system are initiated by an estimate inquiry from a customer, preferably via the Web. Data from a lawn care service administration database is retrieved. The data includes customer demographic information and GPS satellite imaging photographs of various lot size dimensions. The lot size information and customer demographic information are combined to provide at least one quote for the customer estimate inquiry. The data in the database is upgraded and amended as needed by any change in industry standards and customer change requests. At least one quote is displayed to the customer online in response to the estimate inquiry.

21 Claims, 9 Drawing Sheets

U.S. PATENT DOCUMENTS

| | | |
|---|---|---|
| 2004/0044566 A1* | 3/2004 | Bostelmann et al. ........... 705/14 |
| 2004/0122695 A1 | 6/2004 | Tsai |
| 2004/0128172 A1 | 7/2004 | Van Cleave et al. |
| 2005/0033727 A1 | 2/2005 | Abrams |
| 2005/0038688 A1 | 2/2005 | Collins et al. |
| 2005/0144125 A1 | 6/2005 | Erbey et al. |
| 2005/0165521 A1 | 7/2005 | Gruhn |
| 2006/0015467 A1 | 1/2006 | Morken et al. |
| 2006/0041375 A1 | 2/2006 | Witmer et al. |
| 2006/0059880 A1 | 3/2006 | Angott |
| 2006/0111955 A1 | 5/2006 | Winter et al. |
| 2006/0131382 A1 | 6/2006 | Thatcher |
| 2006/0229770 A1 | 10/2006 | Strong |
| 2006/0259421 A1 | 11/2006 | Maass |
| 2007/0015518 A1 | 1/2007 | Winter et al. |
| 2007/0073610 A1 | 3/2007 | Marugabandhu et al. |
| 2007/0100644 A1 | 5/2007 | Keillor et al. |
| 2007/0124257 A1 | 5/2007 | Kowalczyk |
| 2007/0185649 A1 | 8/2007 | Geilich |
| 2007/0233582 A1 | 10/2007 | Abhyanker |
| 2007/0271203 A1 | 11/2007 | Delvat |
| 2007/0273558 A1 | 11/2007 | Smith et al. |
| 2008/0005086 A1 | 1/2008 | Moore |

FOREIGN PATENT DOCUMENTS

| | | |
|---|---|---|
| WO | WO 2000/057318 A1 | 9/2000 |
| WO | WO 2002/017567 A3 | 2/2002 |

* cited by examiner

ONLINE LAWN CARE ESTIMATE PROCESS

CROSS-REFERENCE TO RELATED APPLICATIONS

The present application is related to and claims priority to co-pending U.S. patent application Ser. No. 10/727,634, filed Dec. 5, 2003, the contents of which are incorporated herein by reference in their entirety.

BACKGROUND OF THE INVENTION

1. Field of the Invention

The present invention is generally related to lawn care services and, more particularly, is related to methods and systems for providing an online quoting process for lawn care services.

2. Description of Related Art

Current online lawn care services quoting provides customers with a very broad estimate for desired treatment. Generally, the customer will either telephone or request an online quote for a treatment process for their lawn care service. The treatment process may include a lawn treatment, aeration and spot seeding, pest control, and so forth. The services available are provided by the lawn care service provider and the customer will then pick the treatments desired and request a price for those treatments.

Normally, the customer will provide their lot size dimensions, any previous treatment provided by the lawn care service provider, and the desired treatment service. The lawn care service provider will retrieve any information that he has on the customer, couple that information with the lot size information supplied by the customer, and provide an estimate. If the customer is new to the lawn care provider, then the process for getting an estimate can be very extensive and time consuming. Errors can be made in the lot dimensions given by the customer which could be compounded by the lawn care service provider providing an estimate that is inaccurate as based on inaccurate information supplied by the customer.

Very often, in order to prevent the occurrence of errors that can arise due to inaccurate lot dimensions and demographic information provided to the lawn care service provider, the provider may delay an estimate for a few days. The reason for that delay for a few days is to allow a service representative to view the property, and make his own surveillance and data recordation for an accurate quote. Still, errors can arise in the estimate due to incorrect lot dimension measurement by the representative as well as a delay that is caused by the time spent in visiting the property and then having to provide an estimate from memory after reviewing the property and the surrounding circumstances, sometime earlier. Therefore, there is a need in the art for an online lawn care service quoting method that would provide a real time accurate estimate for lawn care services.

SUMMARY OF THE INVENTION

Embodiments of the present invention provide an online estimating process for quoting lawn care services that may be requested by a customer. Specifically, such methods and systems enable a lawn care services provider to receive an estimating inquiry from a customer via the telephone or online from the Web. Customers post the estimating inquiry on a website which is accessible by the lawn care service administrator. Using current GPS satellite imaging aerial photographs of area lot sizes and customer demographic data stored in the lawn care service provider's database, a real time estimate can be provided for the estimate inquiry.

The estimate will be made available to the customer via the telephone and/or online with the option to accept or modify the estimate request. The treatment request may be confirmed or modified and a new quote can be obtained if desired by the customer.

It is an object of the present invention to provide methods and systems for presenting an online lawn care service quote for lawn care services for a normal business cycle in as little as 15 minutes, depending upon the situation and circumstances surrounding the quote. The GPS satellite imaging photographs are periodically updated to ensure that the most current lot size information is provided. It is another object of the present invention to provide a means for new customers to easily implement their demographic information and lot sizes into the lawn care service provider's system and obtain an estimate for the lawn care services on a timely basis. Still further, it is another object of the present invention to provide the lawn care service provider administrator with a spreadsheet of e-mail addresses, phone numbers, and estimates for the service orders requested for a particular time period.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

The preferred embodiment of this invention will be described in detail, with reference to the following figures, wherein.

DETAILED DESCRIPTION OF THE PREFERRED EMBODIMENT

Figure 1A:
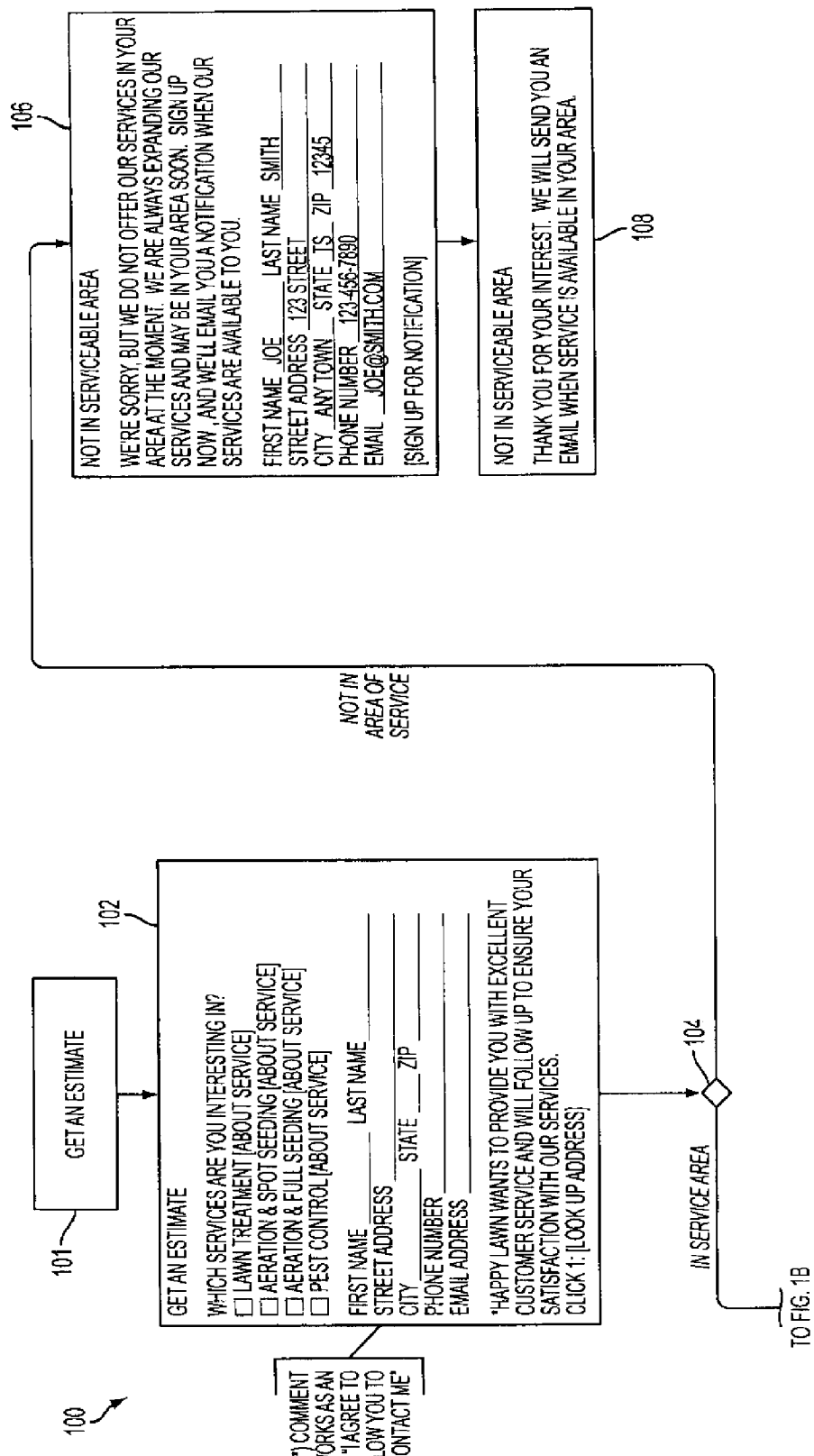
FIG. 1 is a drawing of a flow chart of a preferred method of the present invention.
Figure 1B:
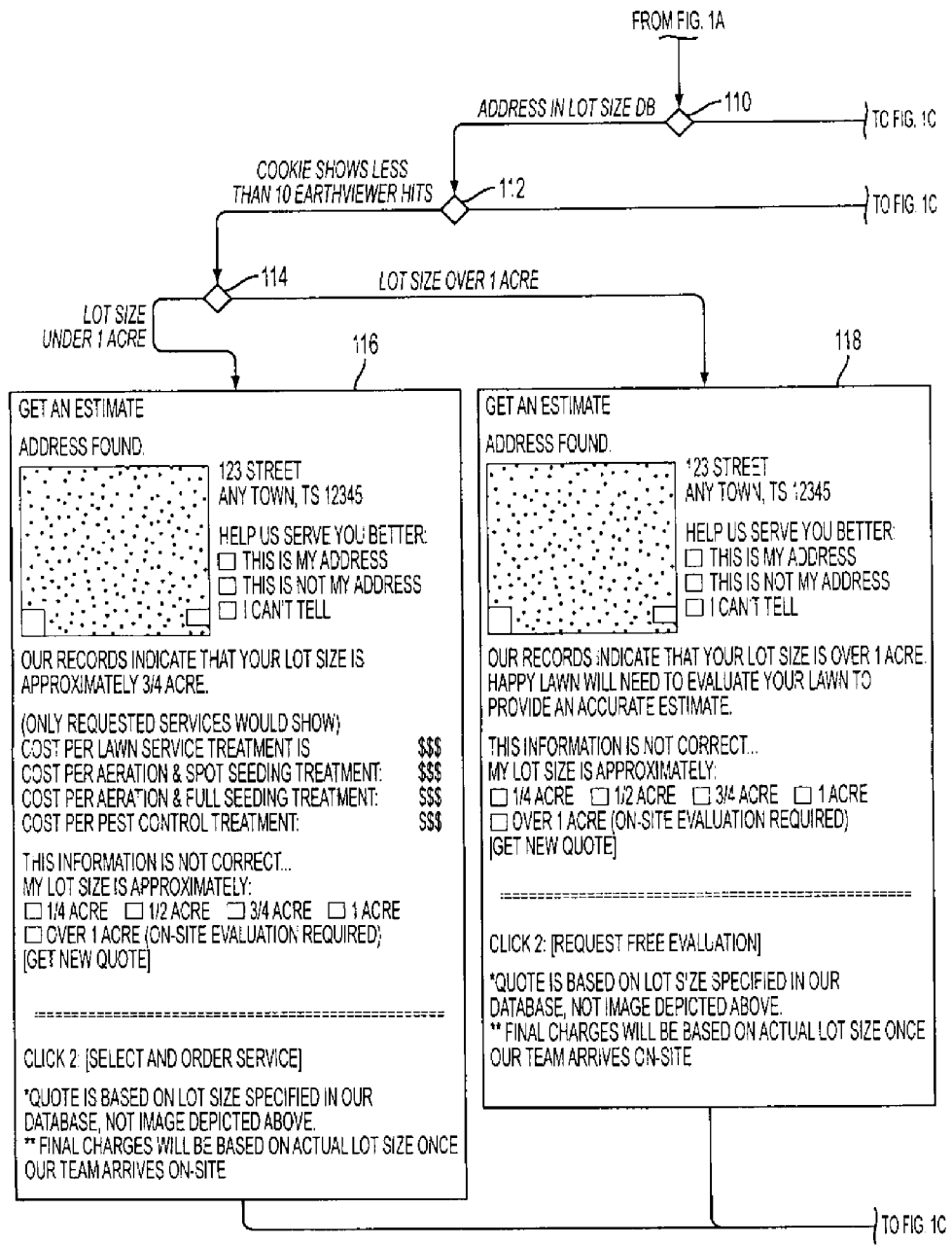
Figure 1C:
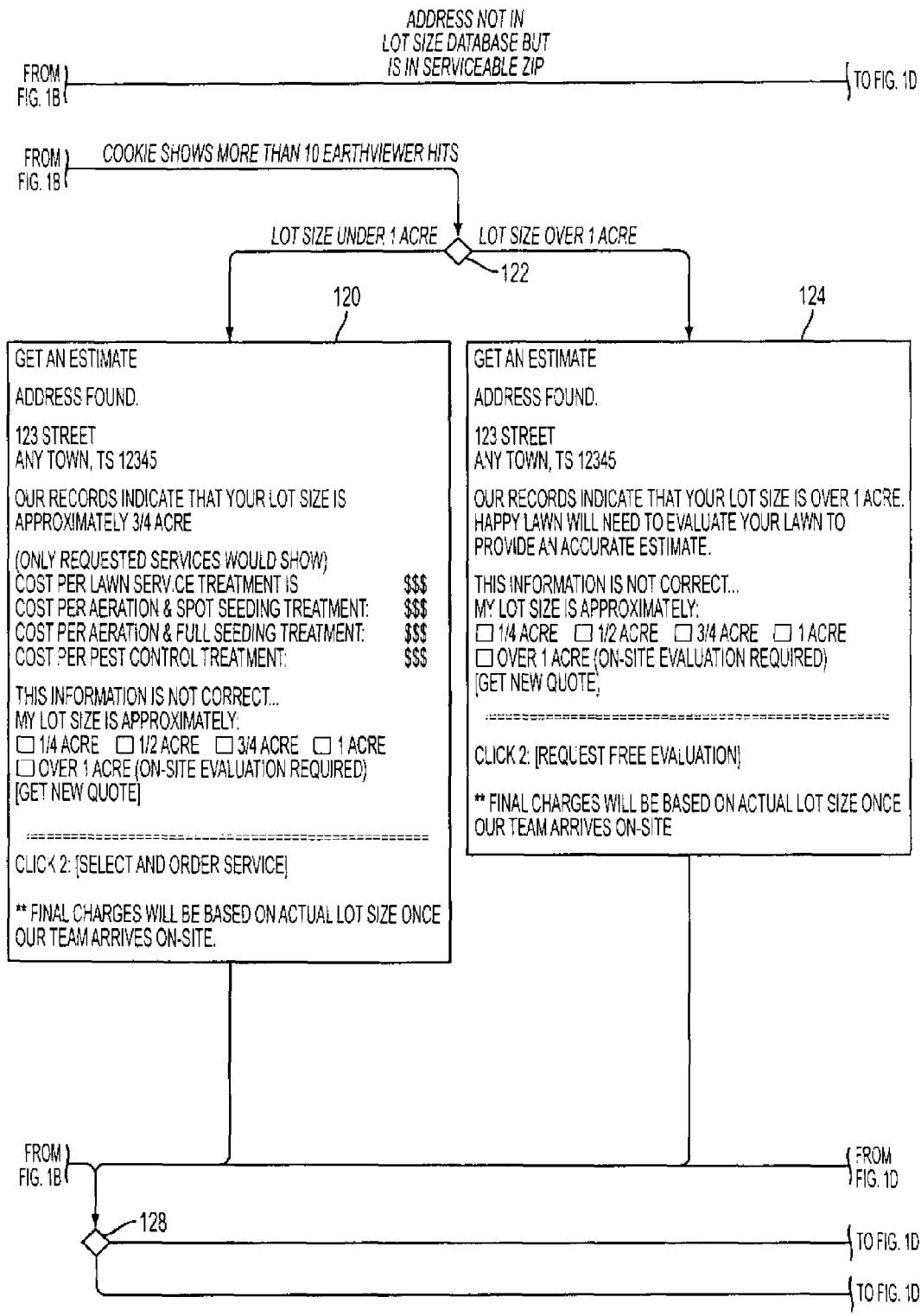
Figure 1D:
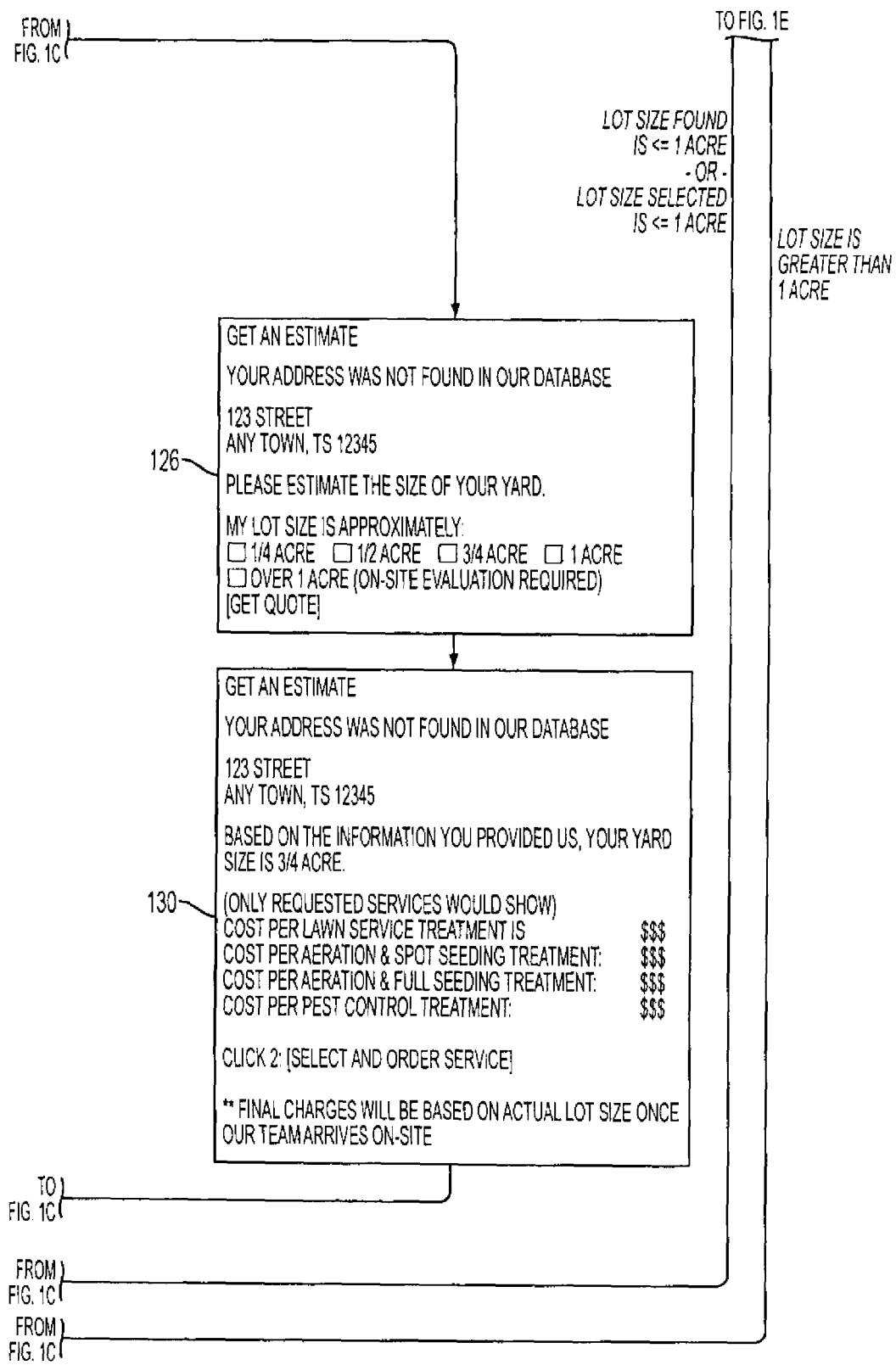
Figure 1E:
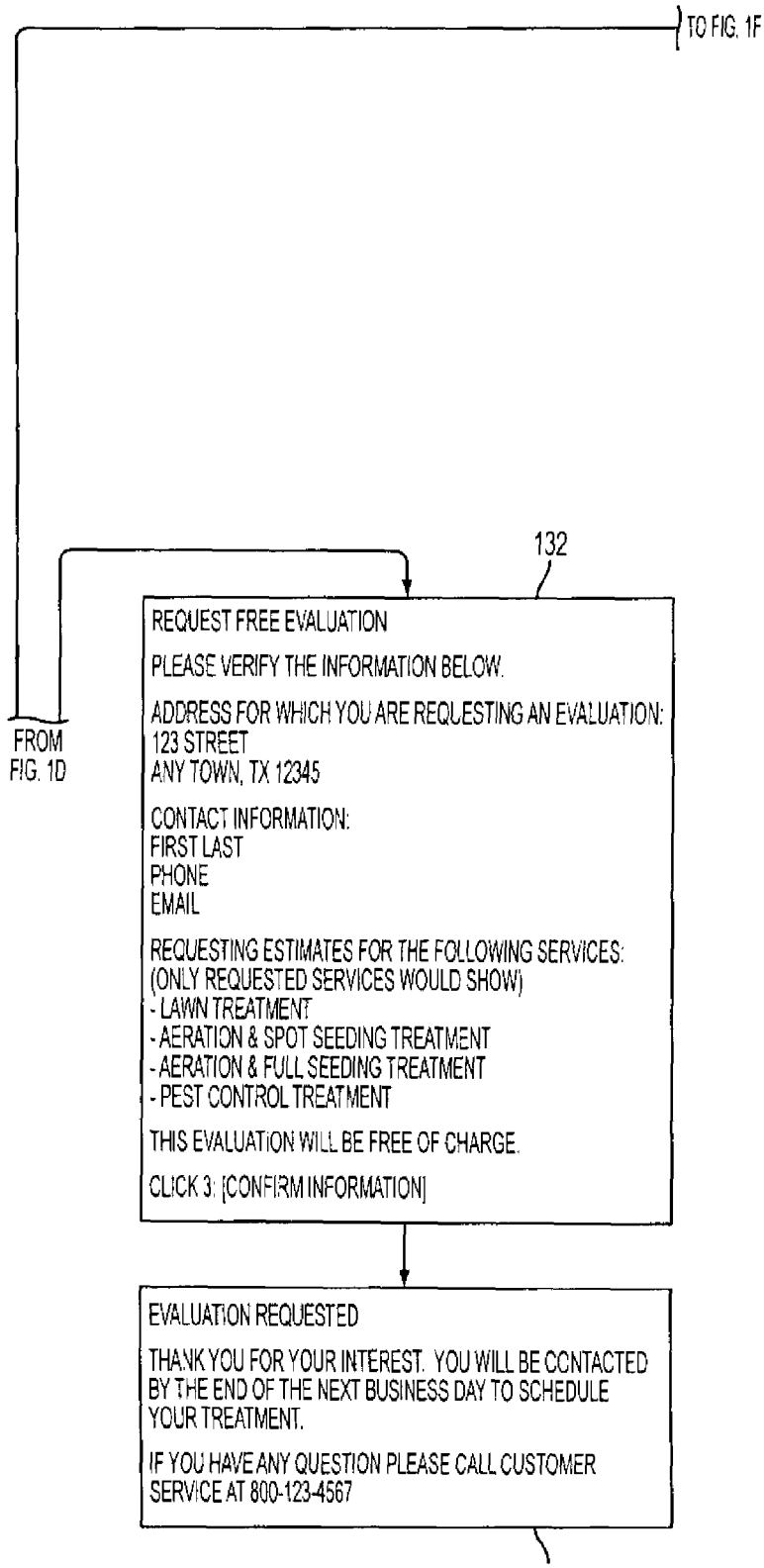
Figure 1F:
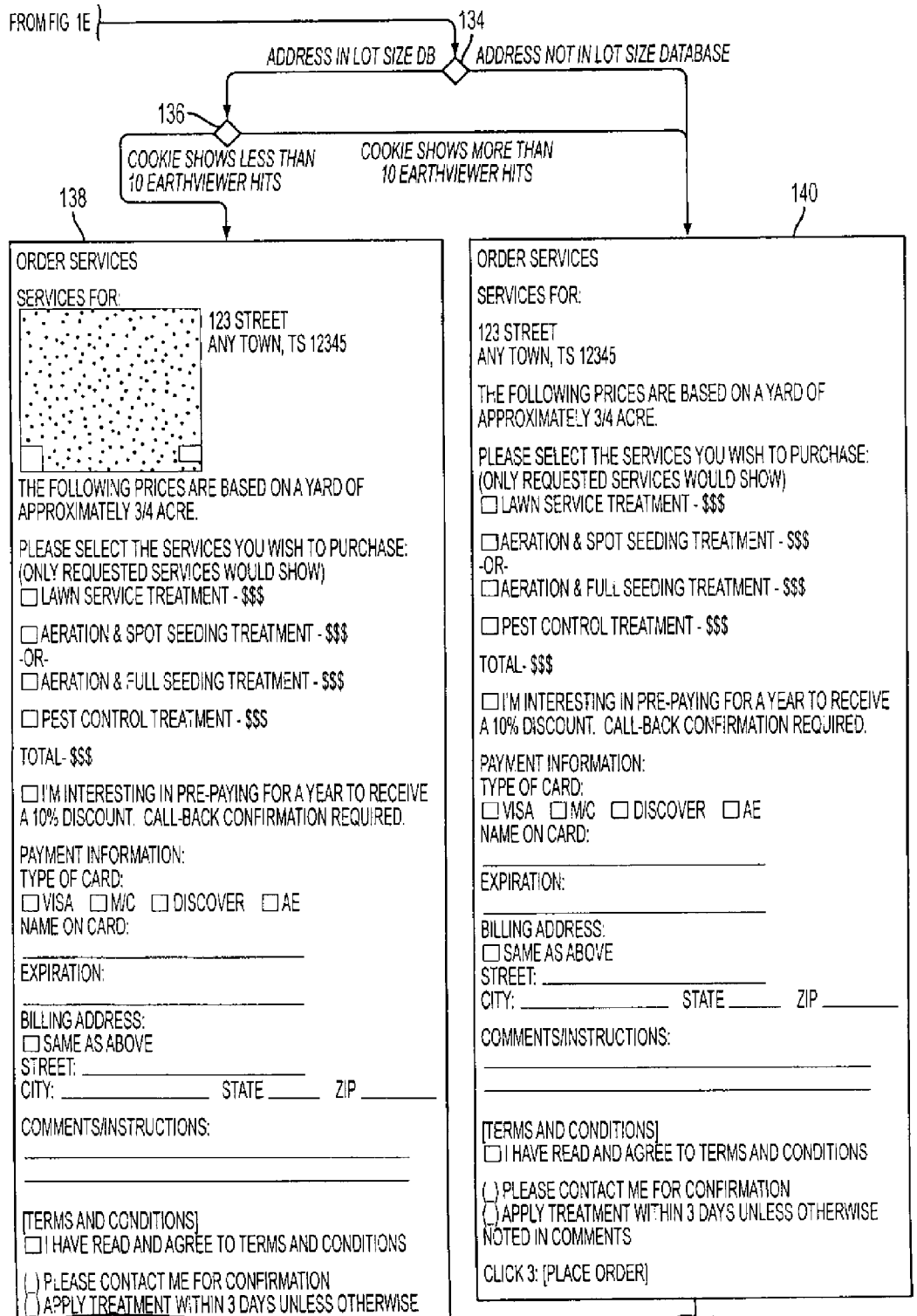
Figure 1G:
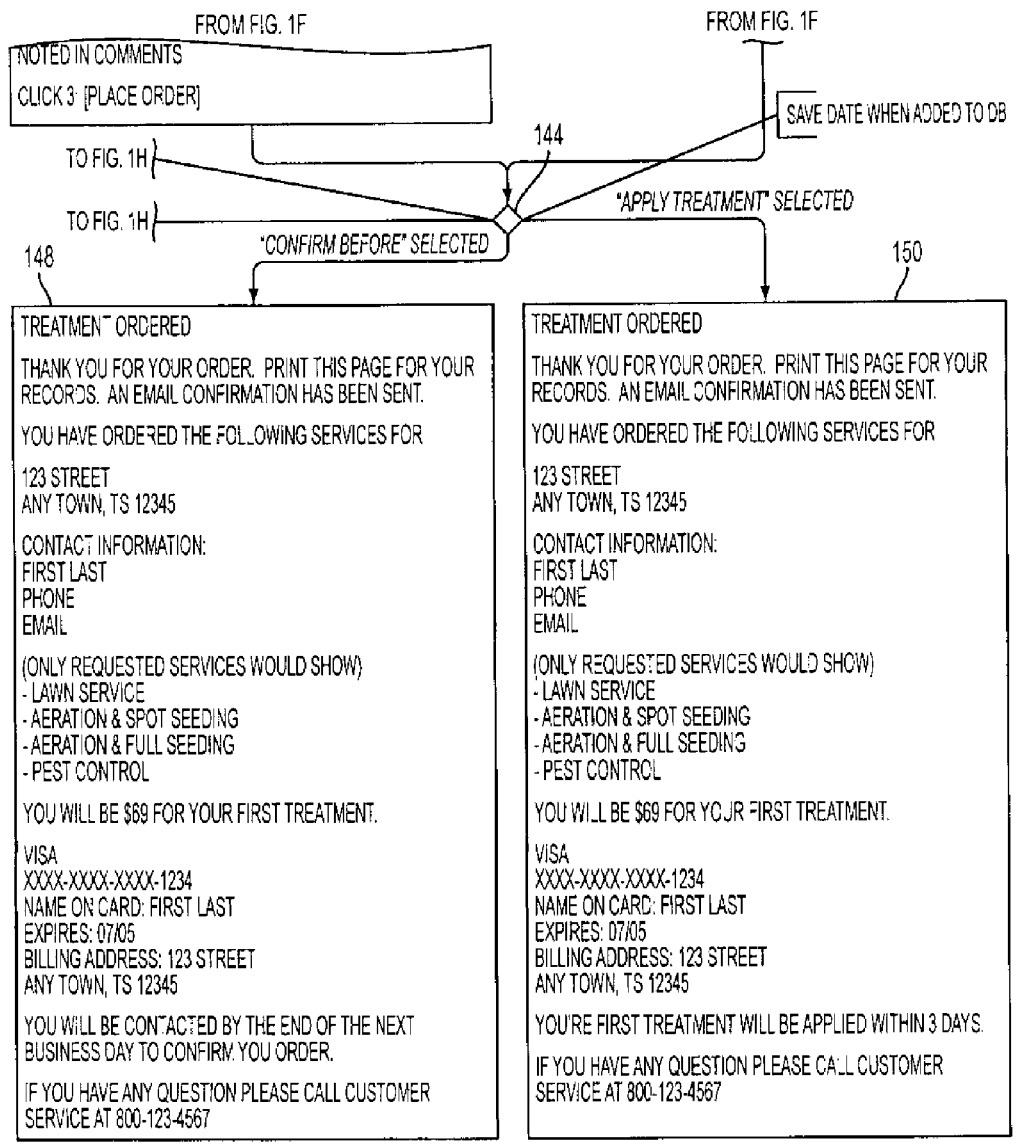
Figure 1H:
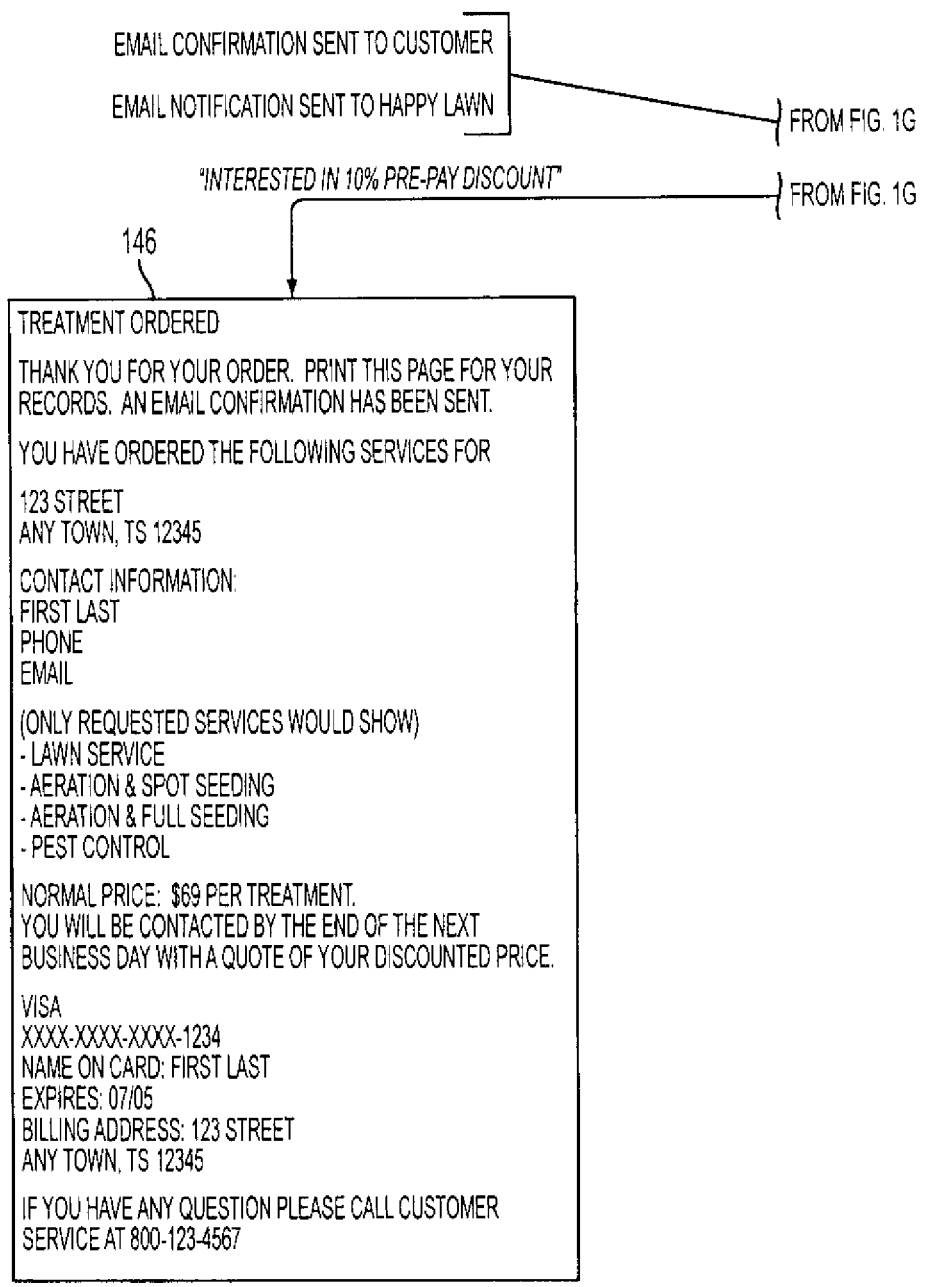

A preferred embodiment of the invention and modifications thereof will now be described with reference to the drawings.

FIG. 1 shows a method 100 for providing online lawn care service estimates. An estimate is requested by the customer in step 101. At step 102, the estimate inquiry is downloaded into a lawn care services provider's database (not shown). The estimate inquiry includes: the services that the customer is interested in, such as lawn treatment, aeration and spot seeding, aeration and fall seeding, and pest control; customer demographic information; and the customer's email address. Step 102 concludes with a request to look up the customer's address in the lawn care service provider's database.

Step 104 applies a query to the information output from step 102 requesting whether the requested service address is in the service area or out of the service area. If the service address is out of the service area, then the information is forwarded to step 106 where the information is added to the lawn care service provider's database (not shown) and a further notification will be sent to the customer by e-mail when service is available in their area, step 108.

If the service address is in the service area, then step 110 is initiated which further requests whether the lot address has a lot size in the lawn care service provider's database (not shown), and, if the address is not in the lot size database (not shown), whether it is in a serviceable zip code. If the address is not in the lot size database (not shown) of the lawn care service provider but it is in a serviceable zip code, then using step 126 the customer will be so notified and requested to provide an estimate for their yard size. Using that information, the system 100 will provide an estimate for the type of lawn service that is requested, step 130.

Where step 110 has determined that the address has a lot size in the lawn care service provider's database (not shown), then a succeeding step 112 will query whether the stored GPS satellite photographs have 10 'earth viewer hits' or whether the GPS satellite photographs show more than 10 'earth viewer hits.' An 'earth viewer hit' is defined as the number of occurrences that are revealed for a particular lot size that has been retrieved in the lawn care service provider's database as based on the customer's supplied information.

In a situation where step 112 shows that the earth viewer hits are less than 10, then step 114 queries whether the lot size from the GPS satellite photographs is under 1 acre or over 1 acre. In a situation where the lot size is under 1 acre, step 116 further requests confirmation as to whether the correct address has been found, displays to the customer an aerial GPS photograph found in the lawn care service provider's database of the lot address, and indicates the costs involved for the requested lawn care services.

Step 116 also provides for correction of the information if the lot size is inaccurate and allows a new quote to be obtained, if so desired.

Step 116 then allows the customer to select the service and forwards the information to order processing in the system 100. Where the lot size is over 1 acre, step 118 displays the lot address corresponding to the lot size found in the database (not shown) and requests confirmation of that address from the customer. The system 100 then indicates that the lawn care service provider has to evaluate the lawn or lot size to provide an accurate estimate. Step 118 also provides for an amendment to the lot address and size by the customer with a request for a new quote, if so desired. Step 118 further provides for the customer to request for a free evaluation for the estimate inquiry when the lawn care service provider comes to the premises to provide an accurate estimate.

In the circumstances where the GPS satellite photographs show more than 10 earth view hits from the query of the step 112, then a further step 122 queries whether the lot size is again is under 1 acre or over 1 acre. Where the lot size is under 1 acre, step 120 indicates that an address has been found and also indicates the cost for the requested services. Step 120 also allows for the information to be amended and a new quote to be obtained. Step 120 further allows for the lawn care service requested to be selected and for the service to be ordered.

For a lot size over 1 acre as determined by step 122, step 124 indicates to the customer that the address has been found but the lot size is over or greater than 1 acre. A message is provided to the customer that the lawn care service provider has to evaluate the lawn to provide an accurate estimate. Step 124 further allows for the information to be corrected or amended, and a new quote to be obtained. Step 124 still further permits the customer to request for a free evaluation based on the supplied information.

The results of steps 116, 118, 120, 124, and 130 are further queried in step 128 to determine whether the lot size found is 1 acre or less than an acre, or greater than 1 acre, and the results are forwarded on into the system 100 for further disposition and processing.

Where the information from the query in step 128 indicates a lot size greater than 1 acre, step 132 prompts the implementation of a request for a free evaluation. Step 132 verifies the demographic information of the customer, verifies the services that have been requested for the estimate and designates that the evaluation will be free of charge. The information from step 132 is then forwarded to step 142 where a 'thank-you' for the evaluation request is implemented and the customer is notified that they will be contacted shortly to schedule a treatment for their lawn care service.

Where the information from the query in step 128 indicates that the lot size is equal to or less than 1 acre, a further step 134 queries whether the address has a lot size in the lawn care service provider's database (not shown) or whether the address of the lot size is not in the lawn care service provider's database (not shown). Where the query from step 134 indicates that both the address and the lot size are in the database (not shown) of the lawn care service provider, a further step 136 queries whether the GPS satellite photos show less than 10 earth viewer hits or whether the GPS satellite photographs show more than 10 earth viewer hits.

Where step 136 indicates that the GPS satellite photographs show less than 10 earth viewer hits, step 138 displays the GPS photograph to the customer, requests confirmation from the customer on the lot size, and provides a check list for the customer to pick the lawn care service treatment that he desires with agreement to a provided list of terms and conditions.

Step 138 also provides for pre-payment for a year of the lawn care service for a 10% discount as well as various payment options. The information from step 138 is then entered for further processing to place an order.

Where the information from the step 134 query indicates that an address was not found for the lot size from the lawn care service provider's database (not shown) and, where the GPS satellite photographs show more than 10 earth viewer hits from the query of step 136, the information from both steps 134 and 136 is entered into step 140 for an ordering of services.

In step 140, no GPS photographs are displayed, but the information presented to the customer indicates that a specific yard or a lot size has prompted the prices for the requested lawn care services that are provided by this step. Step 140 also allows for the prepayment option for a 10% discount as well as various payment methods for the selected lawn care service. The information from step 140 is forwarded to order placement processing.

Step 144 receives the information from steps 138 and 140 and queries whether the customer is interested in a 10% pre-pay discount, whether confirmation is requested, and whether the selected treatment should be applied. If the customer has expressed an interest in a 10% pre-payment based on the query from step 144, then step 146 thanks the customer for his order and prints the page for the customer's records. An email confirmation is also sent. The email confirmation includes the demographic information of the customer, the lawn care service requested, and the price and method of payment for the selected services.

If the data and information from the step 144 query indicates a desired confirmation before selection, then step 148 indicates that the selected treatment has been ordered and a 'thank-you' is implemented. Step 148 prints the 'thank-you' and confirmation, and also generates an email confirmation. The email information shows the customer's demographic information, lawn care service provided, the price for the services, and the payment method. Step 148 also indicates that the customer will be contacted by the end of the next business day to confirm the order.

Finally, if the information from step 144 indicates that a selected treatment is desired, then step 150 prompts a 'thank-you' for the order and also prints the confirmation for the order. An email confirmation is also sent to the customer indicating the demographic information, the lawn care service requested, and the price for the first treatment. Step 150 further shows that the first treatment will be applied within a certain amount of days. The information from step 144 is added to the database (not shown) to update for future lawn care treatment services and to keep track of email notifications and confirmations for services that are requested by the customer.

Figure 2:
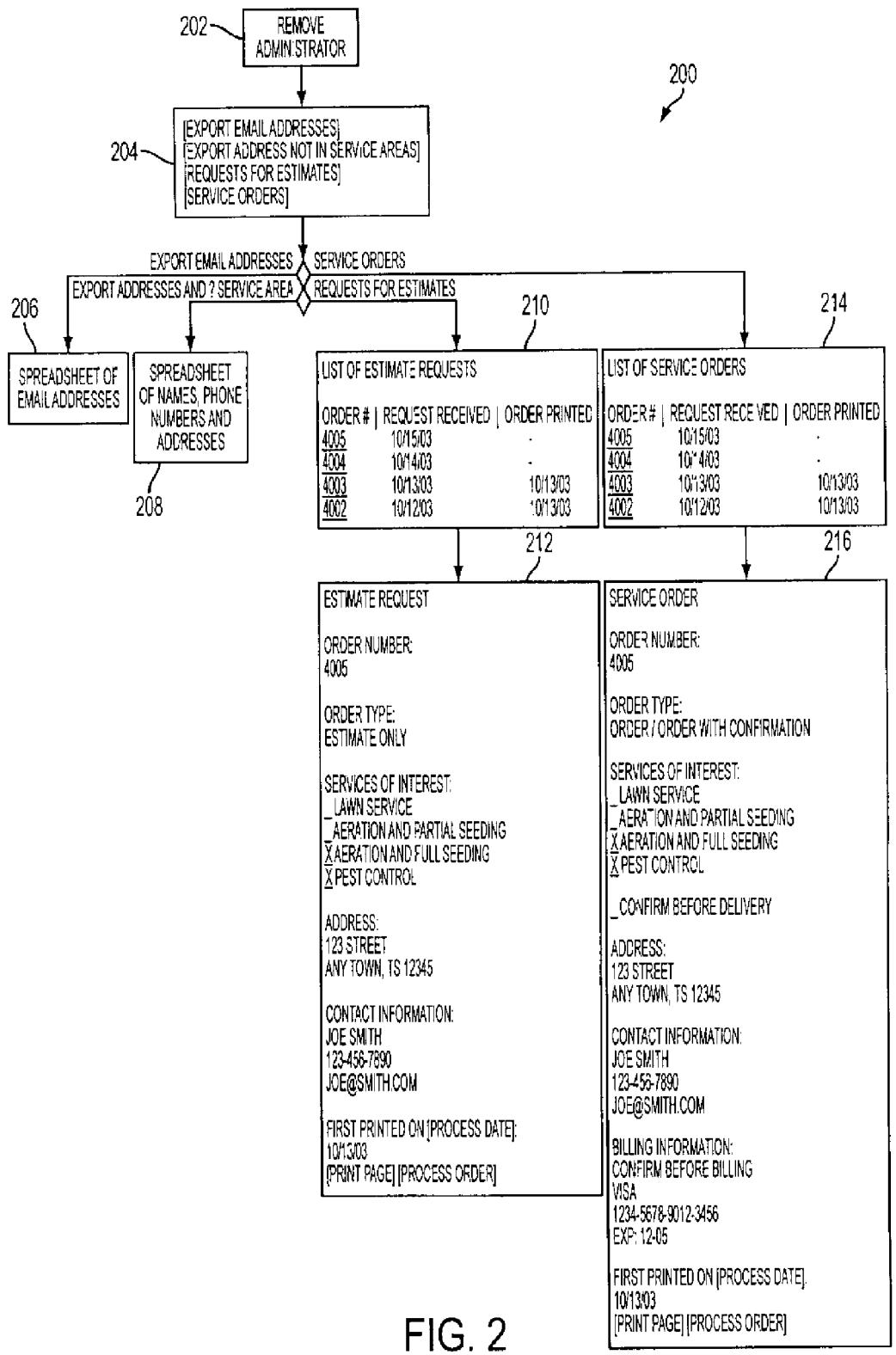
FIG. 2 is a drawing of a flow chart of the remote administrator's access to further privileges.

FIG. 2 shows privileges that are available for the lawn care service provider's administrator. The lawn care service provider administrator can log in at step 202 and export email addresses, requests for estimates and service orders via step 204. Upon request, a spreadsheet of email addresses, step 206, and a spreadsheet of names, phone numbers and addresses, step 208, of the customers can be selected. Also, upon request by the lawn care service provider's administrator, a list of the estimate requests by order number, including the request received date, and the customer's demographic information are available and can be printed in step 210. A list of service orders sorted by order number, date received, and date the order was printed is available in step 214.

A service order, including order number, order type, services of interest, lot address, customer contact information, and customer billing information, can be printed by the lawn care service provider administrator in step 216.

The aforementioned services can be provided on a real time basis with estimates given while a customer is on the phone waiting as well as when the customer has accessed the Web. The GPS satellite imaging photographs are periodically upgraded to ensure that the most up-to-date geographic information is provided for the lot sizes and the customer address matching. Estimates can be given in as little as 15 minutes.

It should be emphasized that the above-described embodiments of the present invention, particularly, any preferred embodiments, are merely possible examples of implementations, merely set forth for a clear understanding on the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. An online computer-implemented lawn care service quoting method using a computer, comprising:
   providing a lawn care service provider database associated with the computer;
   receiving at the computer a request for lawn care services as an estimate inquiry;
   posting said estimate inquiry in a web site accessible to a lawn care service provider;
   identifying a number of times information about at least one lot has been retrieved from the lawn care service provider database by a user;
   retrieving data from the lawn care service provider database, the data including a lot size;
   comparing the lot size to determine whether the lot size is greater or less than one acre in size;
   if the number of times is less than 10 and the lot size is less than one acre, providing a first web page from the web site to the user to input a type of service desired from the lawn care service provider, wherein the first web page includes a GPS photograph showing the lot;
   if the number of times is less than 10 and the lot size is greater than one acre, providing a second web page from the web site to the user to input a request for an evaluation of the customer's lot, wherein the second web page includes the GPS photograph;
   if the number of times is greater than 10 and the lot size is less than one acre, providing a third web page from the web site to the user to input a type of service desired from the lawn care service provider, wherein the third web page does not include the GPS photograph;
   if the number of times is greater than 10 and the lot size is greater than one acre, providing a fourth web page from the web site to the user to input a request for an evaluation of the lot, wherein the fourth web page does not include the GPS photograph; and
   if the lot is not included in the lot size database but is within the pre-determined geographical area, providing a fifth web page from the web site to the user to input a type of service desired from the lawn care service provider or to request an evaluation of the user's lot.

2. The method of claim 1, wherein receiving the estimate inquiry comprises receiving a telephone inquiry from a customer.

3. The method of claim 1, wherein receiving the estimate inquiry comprises receiving an online inquiry on the web from a customer.

4. The method of claim 1, wherein the estimate inquiry comprises a request for services selected from at least one of the group consisting of lawn treatment, aeration and spot seeding, aeration and fall seeding, and pest control; and customer demographic information.

5. The method of claim 1, wherein posting said estimate inquiry in a website accessible to lawn care services administration further comprises:
   querying whether a customer address is located in a service area;
   querying whether a lot size is located in the lawn care service administration database; and
   querying whether a predetermined number of the lot size is available.

6. The method of claim 1, wherein retrieving data from the lawn care service administration database comprises:
   retrieving a plurality of GPS photographs of a lot size in a lawn care service area;
   comparing the lot size GPS photographs to locate the customer's lot; and
   providing a cost for the lawn care service for the customer's lot.

7. The method of claim 6, further comprising:
   querying the customer to confirm the lot size if correct or amend the lot size, if incorrect.

8. The method of claim 1, wherein providing to the customer at least one quote for said estimate inquiry comprises:
   displaying the quote to the customer via the web site.

9. The method of claim 1, wherein providing to the customer at least one quote for said estimate inquiry comprises:
   providing said estimate on a telephone.

10. The method of claim 1, wherein providing to the customer at least one quote for said estimate inquiring further comprises:
    allowing the customer to amend said estimate inquiry.

11. The method of claim 1, wherein confirming the treatment order received for one of the quotes comprises:
    confirming customer demographic information;

confirming lawn care services selected in the treatment order; and confirming costs of the selected lawn care services in the treatment order.

12. The method of claim 11, wherein confirming the treatment order received for one of the quotes further comprises: amending the treatment order.

13. The method of claim 1, wherein confirming the treatment order received for one of the quotes comprises: requesting for a free evaluation.

14. The method of claim 1, wherein confirming the treatment order received for one of the quotes comprises: ordering the treatment order.

15. An online computer-implemented lawn care service quoting method using a computer, comprising:

providing a lawn care service provider database associated with the computer;

receiving at the computer an online estimate inquiry on the web from a customer;

identifying a number of times information about at least one lot has been retrieved from the lawn care service provider database by a user;

retrieving GPS satellite imaging photographs based on the estimate inquiry from which a lot size may be computed and prior lawn treatment data from the lawn care service provider database depending on whether the number of times is more or less than a predetermined numerical value;

comparing the lot size to a pre-determined threshold size determine whether the lot size is greater or less than one acre in size;

if the number of times is less than 10 and the lot size is less than one acre, providing a first web page from the web site to the user to input a type of service desired from the lawn care service provider, wherein the first web page includes a GPS photograph showing the lot;

if the number of times is less than 10 and the lot size is greater than one acre, providing a second web page from the web site to the user to input a request for an evaluation of the customer's lot, wherein the second web page includes the GPS photograph;

if the number of times is greater than 10 and the lot size is less than one acre, providing a third web page from the web site to the user to input a type of service desired from the lawn care service provider, wherein the third web page does not include the GPS photograph;

if the number of times is greater than 10 and the lot size is greater than one acre, providing a fourth web page from the web site to the user to input a request for an evaluation of the lot, wherein the fourth web page does not include the GPS photograph; and if the lot is not included in the lot size database but is within the pre-determined geographical area, providing a fifth web page from the web site to the user to input a type of service desired from the lawn care service provider or to request an evaluation of the user's lot.

16. The method of claim 15, wherein retrieving GPS satellite imaging photographs of lot size and prior lawn treatment data from the lawn care service provider database further comprises:

upgrading and amending the GPS photographs and prior lawn treatment data, respectively.

17. A system for conducting an online lawn care service quote, comprising:

an input device for receiving an estimate inquiry from a customer;

a database for obtaining lot size and prior lawn care service treatment data;

a computer for identifying a number of times information about at least one lot has been retrieved from a lawn care service provider database by a user and comparing the lot size to a pre-determined threshold size, wherein the computer is programmed to:

compare the lot size to a pre-determined threshold size determine whether the lot size is greater or less than one acre in size, if the number of times is less than 10 and the lot size is less than one acre, providing a first web page from the web site to the user to input a type of service desired from the lawn care service provider, wherein the first web page includes a GPS photograph showing the lot, if the number of times is less than 10 and the lot size is greater than one acre, providing a second web page from the web site to the user to input a request for an evaluation of the customer's lot, wherein the second web page includes the GPS photograph, if the number of times is greater than 10 and the lot size is less than one acre, providing a third web page from the web site to the user to input a type of service desired from the lawn care service provider, wherein the third web page does not include the GPS photograph, if the number of times is greater than 10 and the lot size is greater than one acre, providing a fourth web page from the web site to the user to input a request for an evaluation of the lot, wherein the fourth web page does not include the GPS photograph; and if the lot is not included in the lot size database but is within the predetermined geographical area, providing a fifth web page from the web site to the user to input a type of service desired from the lawn care service provider or to request an evaluation of the user's lot; and an output device for providing at least one quote for said estimate inquiry based on the lot size and the number of times, the at least one quote including all or some of the data associated with a customer address information depending on whether the number of times is more or less than a pre-determined numerical value.

18. The system according to claim 17, wherein:

said database for obtaining lot size and prior lawn care service treatment data includes a lawn care service provider database and including data from GPS satellite imaging photographs.

19. The system according to claim 17, wherein:

said input device for receiving an estimate inquiry from a customer uses the web.

20. The method of claim 1, wherein the number of times information about at least one lot has been retrieved from the lawn care service provider database by a user is stored in a cookie file.

21. The system according to claim 15, wherein the number of times information about at least one lot has been retrieved from the lawn care service provider database by a user is stored in a cookie file.

* * * * *